US008301116B2

(12) United States Patent
Kakiuchi

(10) Patent No.: US 8,301,116 B2
(45) Date of Patent: Oct. 30, 2012

(54) USER EQUIPMENT, AUTHENTICATION SYSTEM, AUTHENTICATION METHOD, AUTHENTICATION PROGRAM AND RECORDING MEDIUM

(75) Inventor: Takashi Kakiuchi, Kusatsu (JP)

(73) Assignee: OMRON Corporation, Kyoto (JP)

( * ) Notice: Subject to any disclaimer, the term of this patent is extended or adjusted under 35 U.S.C. 154(b) by 1207 days.

(21) Appl. No.: 11/724,583

(22) Filed: Mar. 15, 2007

(65) Prior Publication Data

US 2007/0270128 A1    Nov. 22, 2007

(30) Foreign Application Priority Data

Mar. 15, 2006  (JP) ................................ 2006-071853

(51) Int. Cl.
   *H04M 1/66* (2006.01)
(52) U.S. Cl. ........ 455/411; 455/410; 455/421; 455/406; 455/407; 455/422.1
(58) Field of Classification Search .................. 455/410, 455/411, 406, 407, 421, 550.1, 408, 422.1, 455/423; 713/172
   See application file for complete search history.

(56) References Cited

U.S. PATENT DOCUMENTS

| 7,257,374 B1 * | 8/2007 | Creigh .......................... 455/41.2 |
| 2004/0123161 A1 | 6/2004 | Harada et al. |
| 2005/0105734 A1 * | 5/2005 | Buer et al. ..................... 380/270 |
| 2005/0224587 A1 | 10/2005 | Shin et al. |

FOREIGN PATENT DOCUMENTS

| DE | 100 59 126 A1 | 6/2002 |
| EP | 1 617 628 A1 | 1/2006 |
| JP | 2005-63342 | 3/2005 |
| JP | 2006-053808 A | 2/2006 |
| WO | 03/036576 A2 | 5/2003 |
| WO | 03/098525 A1 | 11/2003 |

OTHER PUBLICATIONS

Extended European Search Report for Application No. 07104048.9 dated Sep. 2, 2009, 6 pages.
Japanese Office Action issued in Japanese Application No. 2006-071853 mailed on Feb. 15, 2011, and English translation thereof, 5 pages.
Patent Abstracts of Japan, Publication No. 2006-053808, Publication Date: Feb. 23, 2006, 1 page.

* cited by examiner

*Primary Examiner* — Kathy Wang-Hurst
(74) *Attorney, Agent, or Firm* — Osha Liang LLP

(57) ABSTRACT

Spoofing is prevented in an authentication technique using a portable terminal and the like. A portable telephone includes an authentication unit for performing personal authentication of the user, a moving distance calculating unit for calculating a linear moving distance the portable telephone has moved from a position of the portable telephone at the time the authentication unit succeeds in the personal authentication of the user; and a post-authentication communication control unit for disabling the settlement process communication if the linear moving distance calculated by the moving distance calculating unit exceeds a predetermined distance.

4 Claims, 3 Drawing Sheets

USER EQUIPMENT, AUTHENTICATION SYSTEM, AUTHENTICATION METHOD, AUTHENTICATION PROGRAM AND RECORDING MEDIUM

BACKGROUND OF THE INVENTION

1. Field of the Invention

The present invention relates to a user equipment for performing identity verification of the user of the equipment, an authentication system, an authentication method, an authentication program and a recording medium.

2. Description of the Related Art

The need for security strengthening is increasing with widespread use of portable terminals and strengthening of functions. In particular, ensuring of security is an absolute requirement when functions directly related to financial transactions such as electronic money are equipped.

In order to respond to such need, a living body authentication in which ensuring of security is easier is proposed in addition to security measures such as personal identification number and password of the prior art. Among them, face authentication is an identification method normally performed by people in ordinary living, and is often adopted since psychological resistance is small, it can be achieved with small investment since devices that can perform imaging are increasing with widespread use of CCD (Charge Coupled Device) camera etc.

However, the problem of spoofing by person other than the person in question may arise in face authentication, similar to other authentication methods. For example, spoofing is easily carried out with passwords and personal identification numbers if the numbers are leaked through peeping. Regarding fingerprint authentication considered to have a relatively high security, spoofing by pseudo-finger has been reported. Spoofing is easily carried out using the photograph since authentication is performed based on the image in the face authentication technique. This is significant in the authentication technique by portable terminal and the like that can perform authentication at any location as opposed to the authentication technique performed by equipments arranged at a location that may attract public attention.

The prior art documents related to the present invention include Japanese Laid-Open Patent Publication No. 2005-063342 (date of publication: Mar. 10, 2005).

In Japanese Laid-Open Patent Publication No. 2005-063342, the user images his/her face using the camera of the portable telephone right before using the credit card, and transmits the photograph of the face to the credit card company along with the input password; and the credit card company permits the use of the credit card by the user during a predefined time after confirming that the photograph of the face and the password are registered in the database.

SUMMARY OF THE INVENTION

The present invention, in view of the above problems, aims to provide a user equipment for preventing spoofing in the authentication technique using portable terminal and the like, an authentication method, an authentication program and a recording medium.

In order to achieve the above aim, the user equipment according to the present invention relates to a user equipment for performing post-authentication communication with communication equipment after succeeding in personal authentication of the user; the user equipment including an authentication unit for performing the personal authentication of the user; a moving distance calculating unit for calculating a linear moving distance the user equipment has moved from a position of the user equipment at the time the authentication unit succeeds in the personal authentication of the user; and a post-authentication communication control unit for disabling the post-authentication communication if the linear moving distance calculated by the moving distance calculating unit exceeds a predetermined distance.

Furthermore, in order to achieve the above aim, the authentication method according to the present invention relates to a an authentication method in an authentication system, including a user equipment and a communication equipment, for performing a post-authentication communication between the user equipment and the communication equipment after succeeding in personal authentication of the user of the user equipment; the method including the steps of authentication of performing personal authentication of the user; moving distance calculation of calculating a linear moving distance the user equipment has moved from the position of the user equipment at the time the personal authentication was successful; and post-authentication communication control of disabling the post-authentication communication when the linear moving distance calculated in the moving distance calculation step exceeds a predetermined distance.

The authentication system according to the present invention includes the user equipment and the communication equipment for performing the post-authentication communication with the user equipment after succeeding in personal authentication of the user.

According to the above configuration, the user equipment disables the post-authentication communication with the communication equipment if a linear moving distance of the equipment from the time the personal authentication was successful exceeds a predetermined distance.

Therefore, the post-authentication communication must be performed with the communication equipment within a predetermined distance from the location at where the personal authentication was successful in order to perform post-authentication communication with the communication equipment. That is, the personal authentication must be performed within a range having the communication equipment as the center and a predetermined distance as the radius in order to perform the post-authentication communication with a certain communication equipment.

Therefore, it becomes difficult for a person other than the person in question (original person to be authenticated) to approach the communication equipment and perform the post-authentication communication after performing authentication by spoofing at a location distant from the communication equipment by greater than or equal to a predetermined distance. For example, when the communication device is the register at the store front and the predetermined distance is within two meters, the user who needs to make the payment is forced to perform the authentication in front of the clerk, whereby spoofing becomes difficult to carry out.

When the user equipment, which personal authentication was successful, is stolen, the post-authentication communication with the communication equipment arranged at a location distant by greater than or equal to a predetermined distance from the location of the user at the time the authentication was successful becomes difficult to perform. Therefore, the post-authentication communication becomes difficult to perform using the user equipment even by stealing the user equipment, which personal authentication is successful.

Therefore, spoofing by a person other than the person in question can be prevented.

The user equipment may be realized by computer, in which case, the control program (authentication program) of the user equipment for realizing the user equipment with a computer by operating the computer as each unit, and a computer readable recording medium recording the same are also encompassed in the technical scope of the present invention.

The user equipment according to the present invention, therefore, has a configuration including an authentication unit for performing the personal authentication of the user; a moving distance calculating unit for calculating a linear moving distance the user equipment has moved from a position of the user equipment at the time the authentication unit succeeds in the personal authentication of the user; and a post-authentication communication control unit for disabling the post-authentication communication if the linear moving distance calculated by the moving distance calculating unit exceeds a predetermined distance.

The authentication method according to the present invention, therefore, includes authentication of performing personal authentication of the user; moving distance calculation of calculating a linear moving distance the user equipment has moved from the position of the user equipment at the time the personal authentication was successful; and post-authentication communication control of disabling the post-authentication communication when the linear moving distance calculated in the moving distance calculation step exceeds a predetermined distance.

Therefore, the person other than the original person to be authenticated is prevented from carrying out spoofing at a location distant from the communication equipment by greater than or equal to a predetermined distance and then approaching the communication equipment to perform the post-authentication communication, stealing the user equipment, which personal authentication is successful, and performing the post-authentication communication with the communication equipment arranged at a location distant by greater than or equal to the predetermined distance etc.

Consequently, the person other than the original personal to be authenticated is thus prevented from passing one self as the original person to be authenticated.

DETAILED DESCRIPTION OF THE PREFERRED EMBODIMENTS

One embodiment of the present invention will now be described based on FIGS. 1 to 3.

Figure 2:
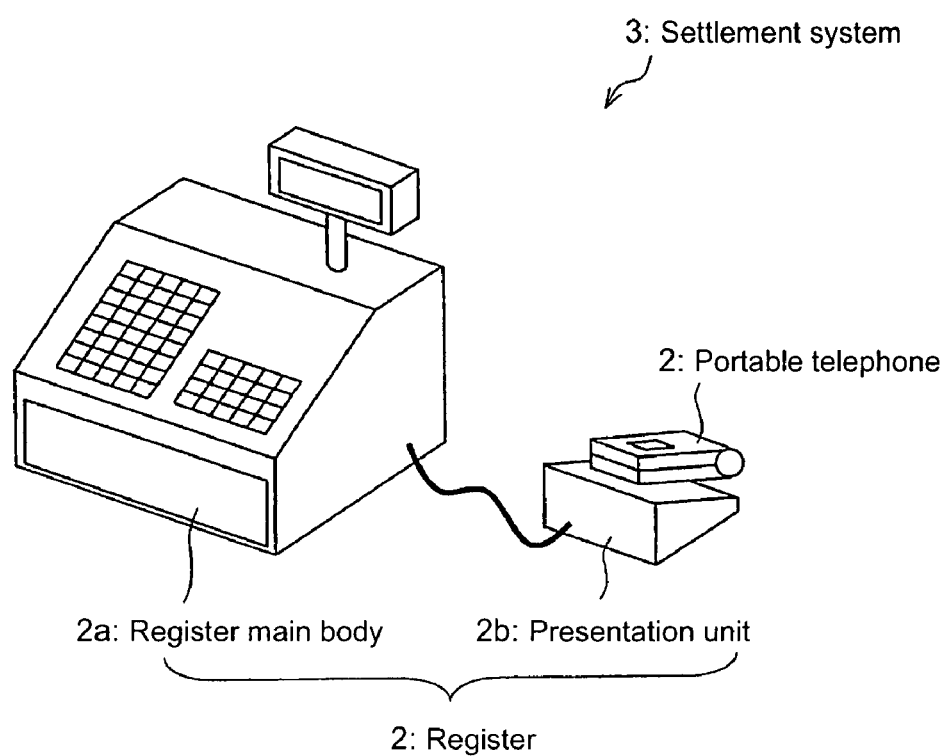
FIG. 2 shows a perspective view showing an outer appearance of the portable telephone and the register shown in FIG. 1.
Figure 3:
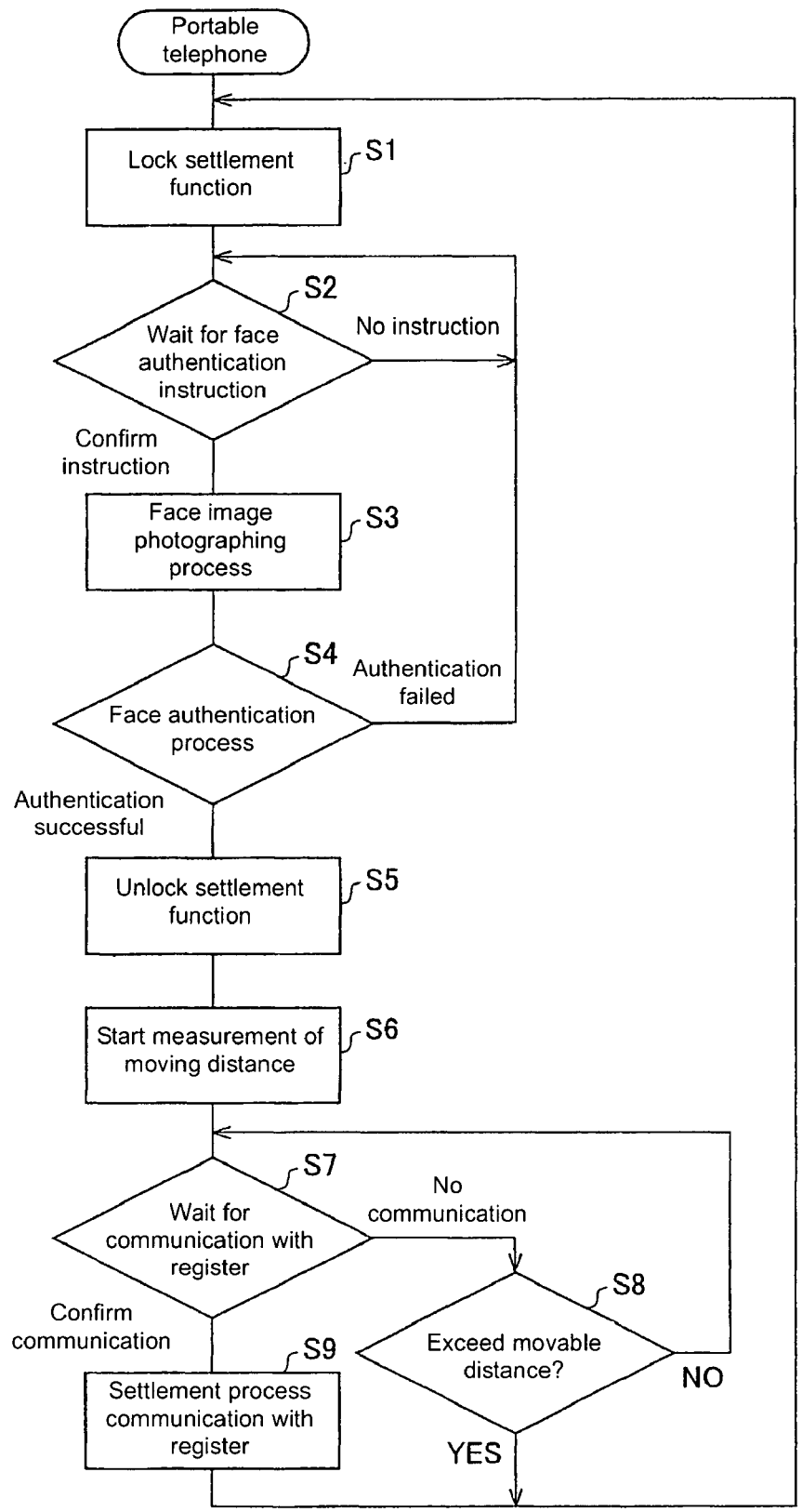
FIG. 3 shows a flow chart illustrating the flow of process in the portable telephone shown in FIG. 1.

FIG. 2 is a perspective view showing an outer appearance of a settlement system (authentication system) 3 according to the present embodiment. In the present embodiment, the settlement system for performing electronic money settlement at the store front using the portable telephone 1 is described by way of example.

The settlement system 3 is configured by a register (communication equipment) 2 attached to a POS terminal at the store front and the like, and a portable telephone (user equipment) 1 having an settlement function and an authentication function. The settlement system 3 performs personal authentication of the user of the portable telephone (user equipment) 1 before communication (post-authentication communication) of the settlement process and the like that requires authentication of the user in advance. That is, the settlement system 3 performs authentication of the user of the portable telephone 1 and performs post-authentication communication with the register 2 if the authentication is successful.

Specific condition describing the present embodiment is a case of when the user makes the payment at the store front with electronic money settlement using the portable telephone 1 having non-contacting IC card function. This settlement is processed by performing the settlement process communication (post-authentication communication) with the portable telephone 1 brought close to the presentation unit 2b of the register 2 after the amount billed is input to the register main body 2a of the register 2 by the clerk, as shown in FIG. 2. In this case, the settlement process communication between the portable telephone 1 and the register 2 is performed by bringing the portable telephone 1 close to the presentation unit 2b of the register 2 with the settlement process communication in the unlocked state after succeeding in the personal authentication of the user in the portable telephone 1.

In the present embodiment, the portable telephone 1 is described by way of example of the user equipment, but the user equipment merely needs to be a terminal device equipped with a camera, and may be PAD (Personal Digital Assistance) or personal computer. The register 2 is described by way of example of the communication equipment, and the case of processing the post-authentication communication with the register 2 is described, but the communication equipment may that which relays the post-authentication communication to external computer and the like. The settlement process communication may be performed by image information such as two-dimensional barcode in addition to electric wave of the non-contacting IC card. Furthermore, the authentication function may be other living body authentication such as fingerprint authentication and vein authentication in addition to the face authentication, or may be a combination of a plurality of authentications.

(Configuration of Portable Telephone 1)

Figure 1:
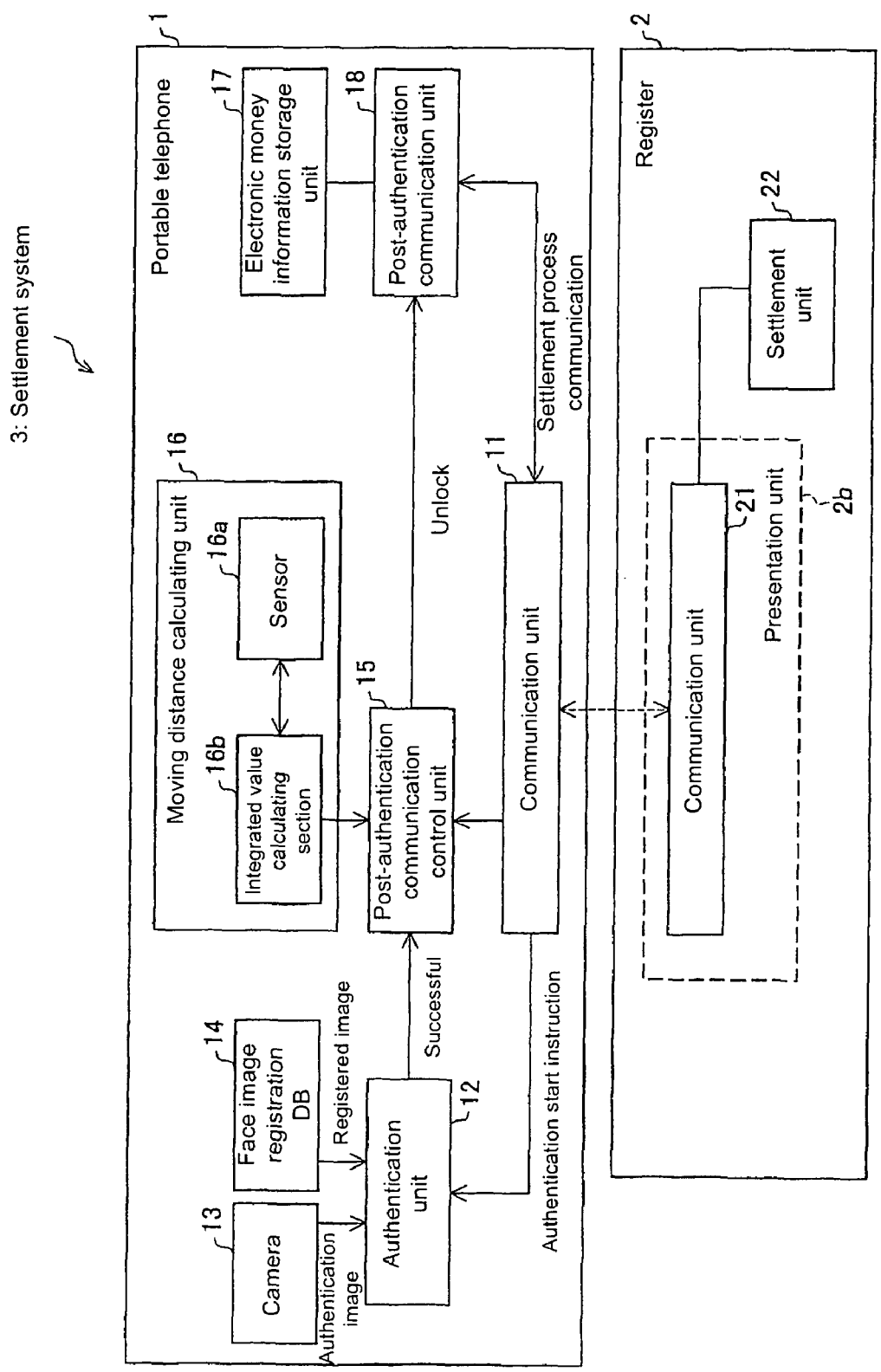
FIG. 1 shows a function block diagram showing a configuration of a portable telephone and a register according to one embodiment of the present invention.

FIG. 1 is a function block diagram showing a configuration of the portable telephone 1 and the register 2.

As shown in FIG. 1, the portable telephone 1 includes a communication unit 11, an authentication unit (authentication means) 12, a camera 13, a face image registration database (DB) 14, a post-authentication communication control unit (post-authentication communication control means) 15, a post-authentication communication unit 18, and an electronic money information storage unit 17. The portable telephone 1 includes display panel, operation key, microphone, speaker etc., which are interfaces for the user, but the configuration thereof is omitted in FIG. 1.

The communication unit 11 communicates with a communication unit 21 of the register 2. In the present embodiment, description is made on the assumption that the connection between the communication unit 11 of the portable telephone 1 and the communication unit 21 of the register 2 is automatically established by simply placing the portable telephone 1 over the presentation unit 2b of the register 2. Furthermore, a case of performing communication using the non-contacting IC will be described in the present embodiment, but is not limited thereto. An arbitrary wired or wireless communication form can be appropriately selected.

The authentication unit 12 performs personal authentication of the user when receiving instruction to start the authentication from the communication unit 11. Specifically, authentication is performed by urging the user to take a picture of the face image, and comparing the face authentication image (hereinafter referred to as authentication image) taken with the camera 13 and the registered image registered in the face image registration DB 14 in advance. Password etc. may be checked in addition to authentication by the authentication image.

A moving distance calculating unit 16 calculates the distance from the position of the portable telephone 1 at the time the authentication was successful to a current position of the portable telephone 1, and includes a sensor 16a and an integrated value calculating section 16b.

The sensor 16a is an acceleration/angular speed sensor, and measures the acceleration and the angular speed produced when the portable telephone 1 moves. The sensor 16a is preferably a three axis sensor in both the acceleration sensor and the angular speed sensor, but may be a two axis sensor, and thus the number of axis of the sensor 16a is not particularly limited. The detection method of the angular speed is not particularly limited, and may be mechanical type or vibration type. The sensor 16a outputs a scalar value indicating the magnitude of the measured acceleration and the angular speed vector to the integrated value calculating section 16b.

The integrated value calculating section 16b obtains an integrated value of the scalar value (hereinafter referred to as actual measured integrated value) by accumulating the scalar value output from the sensor 16a using an accumulator (not shown) arranged therein, and outputs the actual measured integrated value to the post-authentication communication control unit 15.

After the authentication unit 12 succeeds in the personal authentication of the user, the post-authentication control unit 15 compares the actual measured integrated value calculated by the integrated value calculating section 16b and the reference integrated value to be hereinafter described. If the actual measured integrated value exceeds the reference integrated value, the post-authentication communication control unit 15 locks the settlement function of the post-authentication communication unit 18. That is, the post-authentication communication control unit 15 disables the settlement process communication when the actual measured integrated value calculated by the integrated value calculating section 16b exceeds the reference integrated value.

The reference integrated value is a scalar value detected by the sensor 16a while the user carrying the portable telephone 1 moves a predetermined distance. For example, when the predetermined distance is two meters, the scalar value detected by the sensor 16a while the user carrying the portable telephone 1 moves two meters becomes the reference integrated value.

That is, the reference integrated value is a value indirectly defining the movable distance or the linear distance that the user of the portable telephone 1 can move after the authentication is successful, and thus means that the user carrying the portable telephone 1 moves a distance longer than the movable distance if the actual measured integrated value exceeds the reference integrated value.

If the user carrying the portable telephone 1 does not move linearly after the authentication is successful, the actual measured integrated value will not represent the linear distance connecting the position of the portable telephone 1 at the time the authentication was successful and the current position of the portable telephone 1. However, if the actual measured integrated value exceeds the reference integrated value even if the user does not move linearly, determination is made that the user carrying the portable telephone 1 has moved a distance longer than the movable distance.

The post-authentication communication unit 18 communicates with the settlement unit 22 of the register 2 and performs the electronic money settlement process when communication is permitted by the post-authentication communication control unit 15. The post-authentication communication unit 18 reflects the result of the settlement process to the electronic money information storage unit 17.

(Configuration of Register 2)

As shown in FIG. 1, the register 2 includes the communication unit 21 and the settlement unit 22. The register 2 includes communication function with the POS server and input interface and the like for the clerk, but the configuration thereof is omitted in FIG. 1.

The communication unit 21 communicates with the communication unit 11 of the portable telephone 1.

The settlement unit 22 performs billing and settlement with the portable telephone 1 by way of the communication units 11 and 21. Specifically, the electronic money equivalent to the amount input by the operator (clerk) of the register 2 is charged to the portable telephone 1, and the electronic money is acquired.

(Flow of Process)

The flow of the process in the portable telephone 1 will now be described with reference to the flow chart of FIG. 3.

In the portable telephone 1, the settlement function is in the locked state when activated (S1). That is, the function of the post-authentication communication unit 18 is in the locked (disabled) state by the post-authentication communication control unit 15 in the initial state after activation in the portable telephone 1. In this state, the portable telephone 1 waits until instruction for face authentication is input by the user carrying the portable telephone 1 (S2).

When the user shops in the store and inputs the instruction for the face authentication through operation key (not shown) of the portable telephone 1 to make settlement with electronic money, the face authentication command to command face authentication is transmitted to the authenticating unit 12. In response to receiving the face authentication command, the authenticating unit 12 controls the camera 13 to photograph the authentication image.

After the authentication image is photographed, the authenticating unit 12 performs face authentication in which the authentication image and the registered image stored in the face image registration DB 14 are compared (S3) (Authentication Step).

If the face authentication fails, the authenticating unit 12 waits for a new face authentication command to be input (return to S2).

If the authentication is successful, on the other hand, the authenticating unit 12 outputs authentication successful information indicating the success to the post-authentication communication control unit 15.

In response to receiving the authentication successful information, the post-authentication communication control unit 15 unlocks the function (settlement function) of the post-authentication communication unit 18 (S5), and commands the integrated value calculating section 16b of the moving distance calculating unit 16 to start the calculation of the actual measured integrated value.

In response to receiving the command, the integrated value calculating section 16b resets the value of the accumulator to 0, and accumulates the scalar value output from the sensor 16a (S6) (moving distance calculation step).

The post-authentication communication control unit 15 presents messages and the like to the user to urge the user to place the portable telephone 1 over the presentation unit 2b of the register 2 to make the settlement, and waits for the communication to be established with the register 2 (S7).

In the meantime, the post-authentication communication control unit 15 references the actual measured integrated value indicated by the accumulator of the integrated value calculating section 16b at a predetermined interval, and examines whether the actual measured integrated value exceeds the reference integrated value. If the actual measured integrated value exceeds the reference integrated value, that is, if the user moves more than the movable distance (YES in S8), the post-authentication communication control unit 15 locks the settlement function of the post-authentication communication unit 18 (return to S1) (post-authentication communication control step).

When the user places the portable telephone 1 over the presentation unit 2b of the register 2 after checking the settlement amount through the display of the register 2, the connection between the communication unit 11 of the portable telephone 1 and the communication unit 21 of the register 2 is established by such operation. In this case, if the actual measured integrated value does not exceed the reference integrated value, the post-authentication communication unit 18 performs the settlement process communication with the settlement unit 22 of the register 2 (S9).

Finally, after the end of the settlement process communication, the post-authentication communication control unit 15 immediately locks (disables) the function of the post-authentication communication unit 18 in the portable telephone 1 to return to the state same as the initial state after activation.

(Effect of Settlement System 3)

Therefore, in the settlement system 3, after succeeding in authentication in the portable telephone 1 and the settlement function is unlocked, the moving distance of the portable telephone 1 from the relevant point is measured. If the user carrying the portable telephone 1 moves greater than or equal to a predetermined distance, the settlement function is locked. Thus, the face authentication performed using the portable telephone 1 must be performed within a reference circle having the register 2 as the center and the movable distance as the radius.

Person other than the person in question (original person to be authenticated) thus becomes difficult to carry out spoofing outside the reference circle, and to approach the register to perform the settlement process communication after the settlement function is unlocked.

Even if the portable telephone 1 having the settlement function in an unlocked state is stolen, the settlement process communication becomes difficult to be performed with the register 2 arranged at a location distant by greater than or equal to a predetermined distance from the stolen location.

Thus, the use of the settlement system by the person other than the original person to be authenticated by spoofing or theft is prevented.

(Variant)

The sensor 16a of the moving distance calculating unit 16 is the acceleration/angular speed sensor in the above configuration, but the sensor 16a is not limited thereto, and may be a sensor including only the acceleration sensor or a pedometer sensor for measuring the number of steps.

For example, the acceleration sensor capable of detecting the acceleration in the two-dimensional direction may be arranged as the sensor 16a, and the acceleration data of the two-directional component (X direction, Y direction) may be acquired with the movement of the portable telephone 1. The moving distance components in the X, Y directions are calculated from the acceleration data, and the moving distance component in each direction is vector synthesized to calculate the moving distance of the portable terminal. The acceleration sensor may be a single axis sensor or a sensor of three or more axes.

Furthermore, the approximate moving distance can be measured by detecting the periodic up and down vibration of when the person walks by means of the acceleration sensor and multiplying the stride of one step of the relevant person to the number of vibrations (number of steps). The vibration, which is generated when the person walks, involves periodic fluctuation of acceleration, and thus the number of steps of the person can be obtained by detecting such fluctuation with the acceleration sensor.

The reference integrated value is set as the number of steps of when the person walks the movable distance when obtaining the number of steps of the person with the moving distance calculating unit 16. In this case, the settlement function is locked when the user carrying the portable telephone 1 walks more than the predetermined number of steps.

In the configuration using the acceleration sensor or the pedometer sensor, the actual measured integrated value does not represent the linear distance connecting the position of the portable telephone 1 at the time the authentication was successful and the position of the portable telephone 1 after the movement if the user carrying the portable telephone 1 does not linearly move after the authentication is successful. However, if the actual measured integrated value exceeds the reference integrated value even if the user does not move linearly, determination is made that the user carrying the portable telephone 1 has moved a distance longer than the movable distance.

The moving distance calculating unit 16 uses GPS (Global Positioning System) to acquire positional information of the portable telephone 1, and calculates the moving distance of the portable telephone 1 based on the positional information. For example, at the point the command to start calculation of the actual measured integrated value is made by the post-authentication communication unit 18, the moving distance calculating unit 16 acquires the positional information of the portable telephone 1, and subsequently acquires the positional information of the portable telephone 1 at each predetermined measurement timing, and calculates the moving distance based on the positional information acquired at each measurement timing.

The moving distance calculating unit 16 may calculate the moving distance of the portable telephone 1 based on the change in intensity of the electric wave transmitted and received between the portable telephone 1 and the base station of the portable telephone 1.

Therefore, the moving distance calculating unit 16 merely needs to acquire positional information indicating the position of the portable telephone 1 or parameters correlated with the moving distance, and calculate or estimate the moving distance of the portable telephone 1 from the positional information or the parameter.

Furthermore, each block of the portable telephone 1 and the register 2, in particular, the authentication control unit and the post-authentication communication control unit 15 may be configured by hardware logic, or may be realized by software using the CPU as described below.

That is, the portable telephone 1 and the register 2 includes a CPU (Central Processing Unit) for executing the command of the control program for realizing each function, a ROM (Read Only Memory) for storing the program, a RAM (Random Access Memory) for expanding the program, a storage device (recording medium) such as memory for storing the program and various data etc. The object of the present invention is also realized by supplying the recording medium, on which the program code (executable format program, intermediate code program, source program) of the control program (authentication program) of the portable telephone 1 and the register 2 or the software for realizing the above described function is computer readably recorded, to the portable telephone 1 and the register 2 and having the computer (or CPU or MPU) read and execute the program code stored on the recording medium.

The recording medium used may be tapes such as magnetic tape and cassette tape; discs including magnetic discs such as floppy disc®/hard disc and optical disc such as CD-ROM/MO/MD/DVD/CD-R; cards such as IC card (include memory card)/optical card; or semiconductor memories such as mask ROM/EPROM/EEPROM/flash ROM.

The portable telephone 1 and the register 2 may be configured to be connectable to a communication network, and the program code may be supplied through the communication network. The communication network is not particularly limited, and internet, intranet, extranet, LAN, ISDN, VAN, CATV communication network, virtual private network, telephone line, mobile communication network, satellite communication network and the like may be used. The transmission medium configuring the communication network is not particularly limited, and wired medium such as IEEE 1394, USB, power line carrier, cable TV line, telephone line, ADSL line and wireless medium such as infrared line such as IrDA and remote controller, Bluetooth®, 802.11 wireless, HDR, portable telephone network, satellite line, terrestrial digital network and the like may be used. The present invention can be realized in the form of computer data signal embedded in the carrier wave in which the program code is realized in electronic transmission.

The present invention is not limited to each of the above embodiment, and various modifications within the scope of the claims are possible, and it should be recognized that embodiments obtained by appropriately combining the technical means disclosed in each of the different embodiments are encompassed in the technical scope of the present invention.

The present invention is applicable to a device performing authentication for identity verification since spoofing is prevented in the authentication technique using portable telephone etc.

What is claimed is:

1. A user equipment for performing post-authentication communication with communication equipment after succeeding in personal authentication of the user; the user equipment comprising:
   an authentication unit for performing the personal authentication of the user; a moving distance calculating unit for calculating a linear moving distance of the user equipment during a predetermined interval;
   a post-authentication communication unit for functioning to perform an electronic money settlement process communication with the communication equipment;
   a post-authentication communication control unit for locking and unlocking the function of the post-authentication communication,
   wherein the post-authentication communication control unit:
   unlocks the function of the post-authentication communication unit after authentication of the user succeeds;
   commands the moving distance calculating unit to start calculating the linear moving distance of the user unit;
   starts receiving, at the predetermined interval, an integrated value of the linear moving distances of the user each of which is calculated by the moving distance calculating unit, wherein the integrated value is obtained by accumulating a plurality of scalar values;
   judges, at the predetermined intervals, whether the integrated value of the received distances exceeds a predetermined reference value; and
   locks the function of the post-authentication communication unit if the integrated value of the received distances exceeds the predetermined reference value, and
   wherein the post authentication communication unit is allowed to initiate the settlement process communication when the calculated linear moving distance does not exceed the predetermined reference integrated value, and the user places the user equipment over the communication equipment.

2. An authentication system comprising the user equipment according to claim 1, and a communication equipment for performing the post-authentication communication with the user equipment after succeeding in personal authentication of the user.

3. A non-transitory computer readable recording medium recorded with the authentication program that causes a computer to function as each unit of the user equipment according to claim 1.

4. An authentication method in an authentication system, including a user equipment and a communication equipment, for performing a post-authentication communication between the user equipment and the communication equipment after succeeding in personal authentication of the user of the user equipment; the method comprising the steps of:
   authentication of performing personal authentication of the user;
   moving distance calculation of calculating a linear moving distance of the user equipment during a predetermined interval; and
   post-authentication communication control of: approving the post-authentication communication after authentication of the user succeeds;
   starting reception, at the predetermined intervals, of an integrated value of the linear moving distances each of which is calculated in the moving distance calculation, wherein the integrated value is obtained by accumulating a plurality of scalar values;
   judging whether an integrated value of the received distances exceeds a predetermined reference value at the predetermined intervals; and
   prohibiting the post-authentication communication if the integrated value of the received distances exceeds the predetermined reference value, wherein the post-authentication communication is an electronic money settlement process communication.

* * * * *